(12) United States Patent
Malone

(10) Patent No.: US 9,448,133 B2
(45) Date of Patent: Sep. 20, 2016

(54) APPARATUS, SYSTEM, AND METHOD FOR TESTING A TURBOCHARGER

(71) Applicant: General Electric Company, Schenectady, NY (US)

(72) Inventor: Matthew John Malone, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 177 days.

(21) Appl. No.: 14/168,636

(22) Filed: Jan. 30, 2014

(65) Prior Publication Data

US 2014/0144221 A1 May 29, 2014

Related U.S. Application Data

(63) Continuation-in-part of application No. 13/102,700, filed on May 6, 2011, now Pat. No. 8,661,876.

(51) Int. Cl.
G01M 15/02 (2006.01)
G01M 3/02 (2006.01)
G01M 3/26 (2006.01)
G01M 15/09 (2006.01)

(52) U.S. Cl.
CPC ............. *G01M 3/025* (2013.01); *G01M 3/26* (2013.01); *G01M 15/09* (2013.01)

(58) Field of Classification Search
CPC .................................................. G01M 3/025
USPC ............ 73/40, 46, 47, 49.7, 114.56, 114.57, 73/114.77
See application file for complete search history.

(56) References Cited

U.S. PATENT DOCUMENTS

| 4,142,608 | A | 3/1979 | Sarle |
| 4,472,962 | A | 9/1984 | Mennenga |
| 5,412,977 | A | 5/1995 | Schmohl et al. |
| 7,428,839 | B2 | 9/2008 | Figura |
| 7,469,577 | B2 | 12/2008 | Barton |
| 7,694,553 | B2 | 4/2010 | Figura |
| 7,868,774 | B2 * | 1/2011 | Jorgensen ............... B63J 99/00 340/606 |
| 7,937,996 | B2 | 5/2011 | He et al. |
| 8,244,501 | B2 | 8/2012 | Heinkele et al. |
| 2004/0048131 | A1 | 3/2004 | Canepa et al. |

(Continued)

FOREIGN PATENT DOCUMENTS

DE     202009006490     7/2009

OTHER PUBLICATIONS

International Search Report and Written Opinion dated Aug. 20, 2012 which was issued in connection with PCT Application No. US12/36516 which was filed on May 4, 2012.

*Primary Examiner* — Eric S McCall
(74) *Attorney, Agent, or Firm* — GE Global Patent Operation

(57) ABSTRACT

A testing apparatus for a turbocharger is provided. In one example, the testing apparatus comprises a regulatable air input source configured to fluidically couple to one of an oil inlet or an oil outlet of an oil structure cavity of the turbocharger, an air flow measurement device including a flow restrictor which is configured to be coupled to the regulatable air input source, and media embodying instructions for correlating an amount of measured air flow measured by the air flow measurement device to a degree, rate, and/or amount of leakage past a turbocharger bearing component configured to restrict flow to or from the oil structure cavity.

19 Claims, 9 Drawing Sheets

(56) References Cited

U.S. PATENT DOCUMENTS

| | | |
|---|---|---|
| 2005/0193810 A1 | 9/2005 | Gladden |
| 2006/0196256 A1 | 9/2006 | Rohde |
| 2007/0151329 A1* | 7/2007 | Thomas .............. G01M 3/2869 73/46 |
| 2007/0157714 A1* | 7/2007 | Rankin ................ G01M 3/025 73/114.56 |
| 2009/0024295 A1 | 1/2009 | Swenson et al. |
| 2010/0000309 A1 | 1/2010 | Bierl et al. |
| 2010/0146966 A1 | 6/2010 | Burkhardt et al. |
| 2010/0153067 A1 | 6/2010 | Heinkele et al. |
| 2011/0283777 A1* | 11/2011 | Chrissis .................. G01M 3/22 73/40.7 |
| 2012/0173076 A1 | 7/2012 | Anderson |

\* cited by examiner

APPARATUS, SYSTEM, AND METHOD FOR TESTING A TURBOCHARGER

CROSS REFERENCE TO RELATED APPLICATIONS

This application is a continuation-in-part of U.S. patent application Ser. No. 13/102,700 filed May 6, 2011, the entirety of which is hereby incorporated herein by reference for all purposes.

FIELD

Embodiments of the subject matter herein relate to a testing kit and methods for testing a turbocharger, for example.

BACKGROUND

Turbochargers may be used in an engine system to increase a pressure of air supplied to the engine for combustion. In one example, the turbocharger includes a turbine, coupled in an exhaust passage of the engine, which at least partially drives a compressor via a shaft to increase the intake air pressure. High pressure air from the turbine or the compressor may leak by non-contact labyrinth seals and turbocharger bearings into an oil cavity surrounding the shaft of the turbocharger. Because the low pressure oil cavity is in fluid communication with a crankcase of the engine, crankcase pressure may increase due to the leakage of the high pressure air leading to crankcase over-pressure events and removal of the turbocharger from the engine system.

In other examples, crankcase over-pressure events may occur due to other factors, such as degradation of piston rings, which increase blow-by around the piston, and/or degradation of an evacuation system which maintains a pressure of the crankcase. In such examples, however, the turbocharger may still be removed from the engine system even though it is not the cause of the crankcase over-pressure event, as the exact cause of the crankcase over-pressure event may be unknown.

BRIEF DESCRIPTION

In one embodiment, a testing apparatus comprises a regulatable air input source configured to fluidically couple to one of an oil inlet or an oil outlet of an oil structure cavity of a turbocharger. The testing apparatus further comprises an air flow measurement device including a flow restrictor which is configured to be coupled to the regulatable air input source, and media embodying instructions for correlating an amount of measured air flow measured by the air flow measurement device to at least one of a degree, rate, or amount of leakage past a turbocharger bearing component configured to restrict flow to or from the oil structure cavity.

In one embodiment, by coupling an air supply to an oil cavity of a turbocharger, flow of air past a bearing component, such as a non-contact seal or bearing, may be measured via the flow restrictor. An increased flow may correspond to an increased degree of leakage, and may indicate degradation of the bearing component, such as the non-contact seal or bearing, for example. In this manner, degradation of the turbocharger may be indicated or detected such that the turbocharger may be removed from an engine to which it may be coupled for repair. In some embodiments, the oil cavity may be fluidically isolated from the oil system such that the turbocharger may be tested without removing the turbocharger from the engine (e.g., the turbocharger remains bolted to the engine during testing). As such, the turbocharger may be removed only if degradation is indicated.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
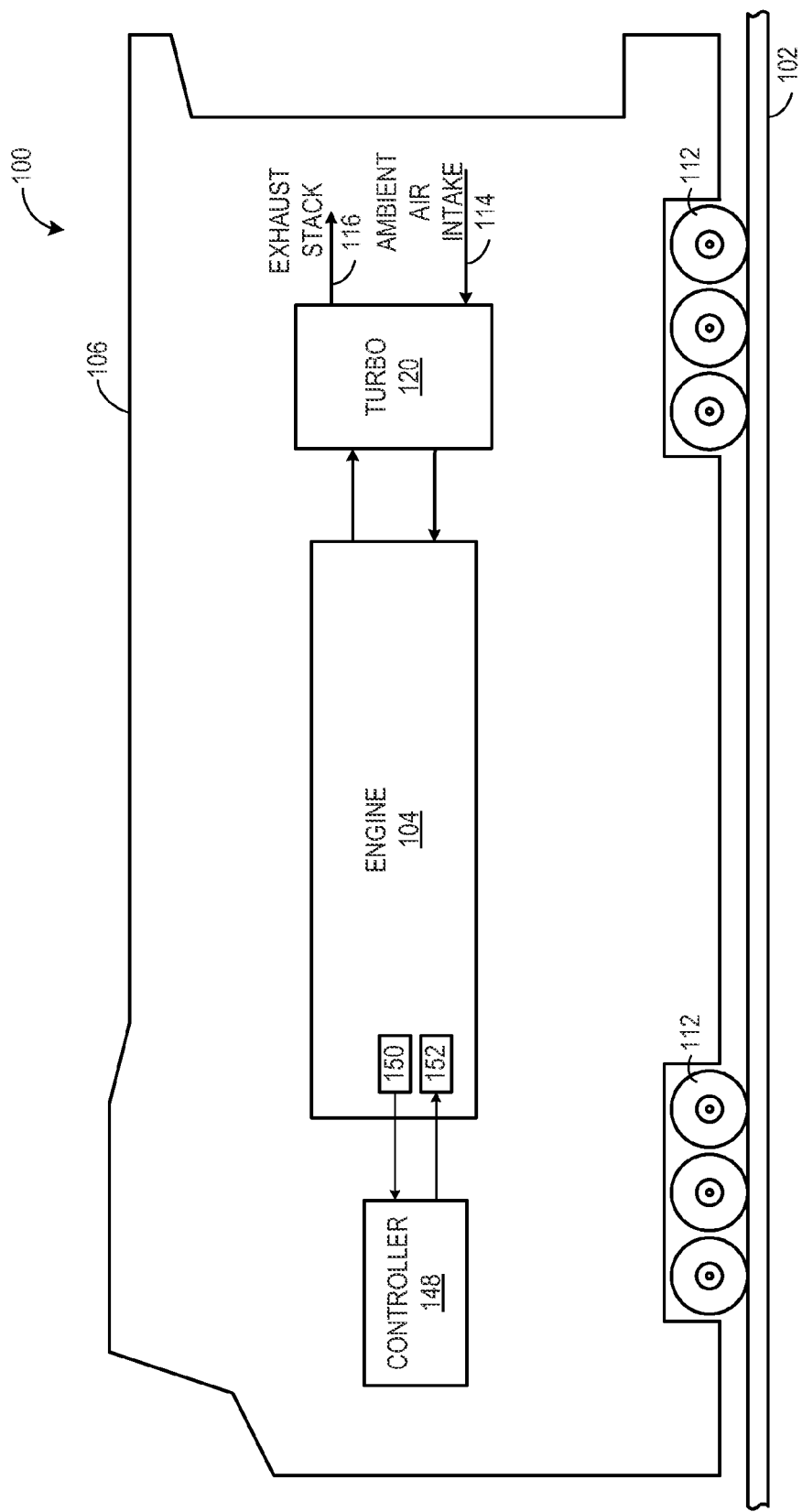
FIG. 1 shows a schematic diagram of a vehicle with a turbocharger according to an embodiment of the invention.

The following description relates to various embodiments of a kit for a testing apparatus for a turbocharger and methods for testing the turbocharger. In one embodiment, a kit for a testing apparatus for a turbocharger is provided. The turbocharger includes a turbine, a compressor, a non-contact seal positioned between an oil cavity and either the turbine or the compressor, and a bearing positioned between the oil cavity and either the turbine or the compressor. A regulatable air input is fluidically coupled to an outlet of the oil cavity and to an air supply. A flow restrictor with at least one pressure sensor is coupled to the regulatable air input. A media has instructions that specify correlating an amount of flow to a degree of leakage past the non-contact seal. Likewise, the media has instructions that specify correlating an amount of flow to a degree of leakage past the bearing when the regulatable air input is fluidically coupled to the inlet of the oil cavity. From such correlations, for example, it is possible to identify whether or not crankcase over-pressure is due to turbocharger shaft seal degradation, or to some other source.

The kit may include a pressurizable bladder configured to couple to a drain passage of the oil cavity, and a plug configured to couple to an inlet of the oil cavity, and the media may further embody human-readable instructions that specify inserting the pressurizable bladder in the drain passage of the oil cavity and inflating the pressurizable bladder, and inserting the plug into the inlet of the oil cavity.

By plugging the oil inlet and the drain passage, the oil cavity may be fluidically isolated from the oil system. Because air may only exit the oil cavity through the non-contact seal, degradation of the non-contact seal may be determined by coupling an air supply to the oil cavity of the turbocharger, and measuring a flow of air past the non-contact seal. In this manner, the turbocharger may be removed from an engine to which it may be coupled only when degradation is indicated.

The kit may further be configured to identify the degradation of a bearing component, such as the bearing, a bearing seal, bearing clearance volume, or other component. A regulatable air input is fluidically coupled to an inlet of an oil cavity and to an air supply. A flow restrictor with at least one pressure sensor is coupled to the regulatable air input. A media has instructions that specify correlating an amount of flow to a degree of leakage past the bearing component. From this correlation, for example, it is possible to identify whether or not crankcase over-pressure is due to turbocharger shaft bearing component degradation, or to another source.

The oil inlet of the turbocharger may be fluidly coupled with a passage that supplies oil to the bearing. The passage may be located within a turbocharger casing and may be fluidically isolated from the oil system by a bearing. Because air may only exit the oil inlet through the turbocharger bearing, plugging the oil outlet is not necessary, and degradation of the bearing may be diagnosed by coupling an air supply to the oil inlet of the turbocharger with the turbocharger installed on the engine, with no other modifications, and measuring a flow of air past the bearing. In this manner, degradation of the turbocharger may be indicated such that turbocharger may be removed from an engine to which it may be coupled when degradation is indicated.

In an example, the amount of measured air flow correlated to bearing degradation is separate and distinct from any airflow through an intake air passage of a compressor of a turbocharger in which the bearing, non-contact bearing seal, or other bearing component is positioned.

In one embodiment, the turbocharger may be coupled to an engine in a vehicle. A locomotive system is used to exemplify one of the types of vehicles having engines to which a turbocharger, or multi-turbocharger, may be attached. Other types of vehicles may include on-highway vehicles, off-highway vehicles, mining equipment, and marine vessels. Other embodiments of the invention may be used for turbochargers that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

FIG. 1 shows a block diagram of an embodiment of a vehicle system 100 (e.g., a locomotive system), herein depicted as a rail vehicle 106, configured to run on a rail 102 via a plurality of wheels 112. As depicted, the rail vehicle 106 includes an engine system with an engine 104.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106.

The engine system includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is shown, the system may include multiple turbine and/or compressor stages. The turbocharger is described in greater detail below with reference to FIGS. 2 and 4.

In some embodiments, the vehicle system 100 may further include an exhaust gas treatment system coupled in the exhaust passage upstream or downstream of the turbocharger 120. In one embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, or various other devices or systems.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, etc. Correspondingly, the controller 148 may control the vehicle system 100 by sending commands to various components such as fraction motors, alternator, cylinder valves, throttle, etc. In one example, the controller 148 may shut down the engine in response to an engine crankcase pressure greater than a threshold pressure, as will be described in greater detail below.

In one embodiment, the controller may include a communication system for reporting one or both of a flow measurement device output or a determined degradation of the turbocharger based on a measurement of pressure or flow generated by the flow measurement device, as will be described in greater detail below.

Figure 2:
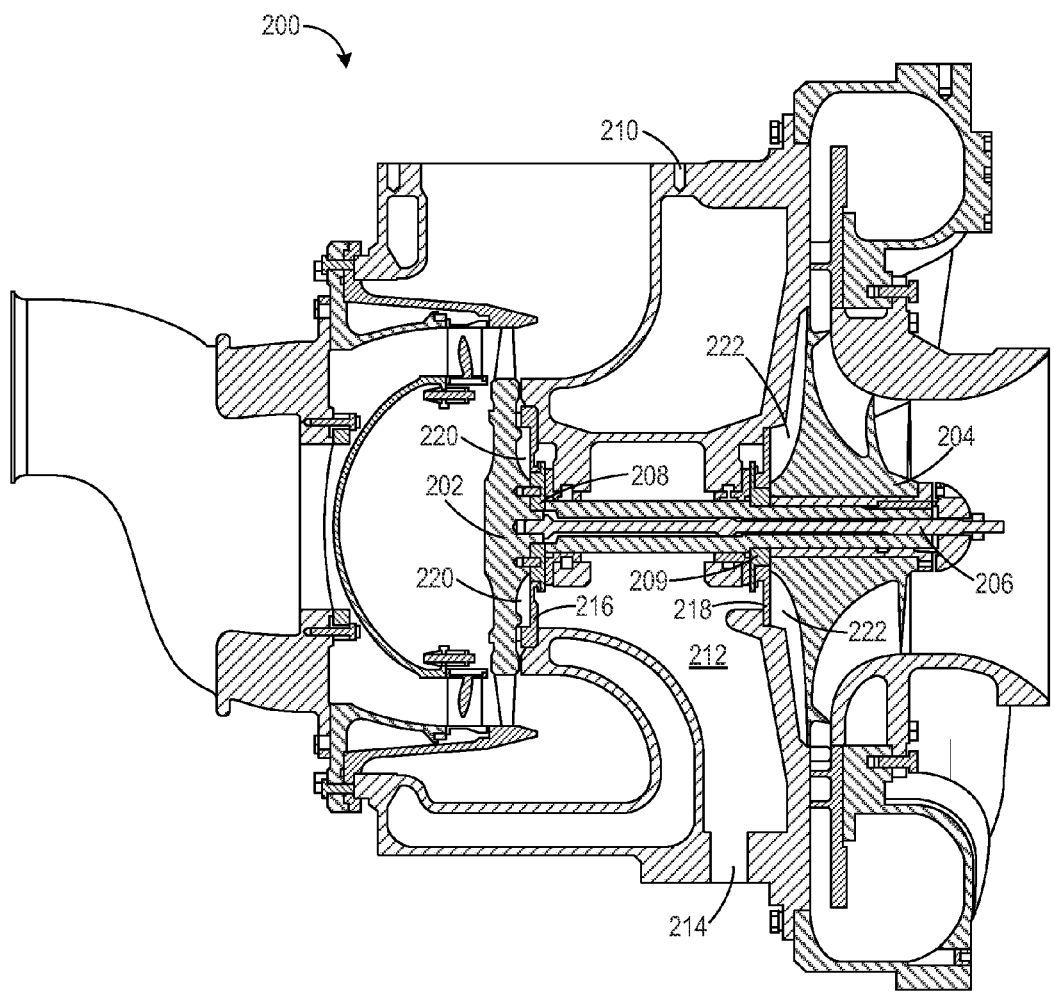
FIG. 2 shows a cross-sectional view of a turbocharger according to an embodiment of the invention.

FIG. 2 shows an embodiment of a turbocharger 200 that may be coupled to an engine, such as turbocharger 120 described above with reference to FIG. 1. In one example, turbocharger may be bolted to the engine. In another example, the turbocharger 200 may be coupled between the exhaust passage and the intake passage of the engine. In other examples, the turbocharger may be coupled to the engine by any other suitable manner.

The turbocharger 200 includes a turbine 202 and a compressor 204. Exhaust gases from the engine pass through the turbine 202, and energy from the exhaust gases is converted into rotational kinetic energy to rotate a shaft 206 which, in turn, drives the compressor 204. Ambient intake air is compressed (e.g., pressure of the air is increased) as it is drawn through the rotating compressor 204 such that a greater mass of air may be delivered to the cylinders of the engine.

In some embodiments, the turbine 202 and the compressor 204 may have separate casings which are bolted together, for example, such that a single unit (e.g., turbocharger 200) is formed. As an example, the turbocharger may have a casing made of cast iron and the compressor may have a casing made of an aluminum alloy.

The turbocharger 200 further includes bearings 208 and 209 to support the shaft 206, such that the shaft may rotate at a high speed with reduced friction. As depicted in FIG. 2, the turbocharger may include a lubrication system to reduce degradation of the bearings and to maintain a temperature of the bearings (e.g., to keep the bearings cool). While the engine is in operation, a constant flow of engine oil or engine coolant may pass through the turbocharger, for example. The bearings may include races, with a clearance between an inner diameter of a race and an outer diameter of the shaft. In one example, pressurized engine oil may enter the turbocharger via an oil inlet 210. The oil may enter the space between the inner diameter of the race and the outer diameter of the shaft, thereby lubricating the shaft and reducing friction between the bearing and the shaft. Excess oil may collect in an oil cavity 212, and the oil leaves the turbocharger 200 through an outlet 214.

As depicted in FIG. 2, the turbocharger 200 further includes two non-contact seals (e.g., labyrinth seals), a turbine labyrinth seal 216 positioned between the oil cavity 212 and the turbine 202 and a compressor labyrinth seal 218 positioned between the oil cavity 212 and the compressor 204.

A labyrinth seal as used herein refers to a type of mechanical seal that provides a tortuous path to help prevent leakage. In one embodiment, the labyrinth seal may be composed of many grooves or threads that press tightly against another component. Herein, the labyrinth seal is applied to a rotating shaft system, with a small clearance between tips of the labyrinth threads of a seal inner diameter and the running surface of a shaft outer diameter. In this way, the labyrinth seal provides non-contact sealing action by controlling the passage of fluid. The labyrinth seals 216 and 218 may thus reduce leakage of the engine oil used to lubricate the bearings 208 and 209 to the turbine 202 and the compressor 204, for example, by providing a contorted, tortuous path. Because the labyrinth seals 216 and 218 are non-contact seals, friction around the bearings 208, 209, and the shaft 206 may be reduced, while oil leakage is also reduced. In one example, the labyrinth seals 216 and 218 may be spaced a determined distance from the bearings 208 and 209. Suitable determined distances may be determined with reference to application specific parameters, such as in a range of less than ~1/4000 of an inch.

High pressure air from the exhaust passage may occupy a space 220 determined by the turbine labyrinth seal 216. High pressure air from the compressor may occupy a space 222 determined by the compressor labyrinth seal 218. As such, on one side of the labyrinth seals 216 and 218, there is air at a first pressure, and on the other side of the labyrinth seals 216 and 218, there is oil at a second pressure. The oil and the air may be at a different pressure relative to each other. In some examples, a pressure imbalance may occur in the rotating assembly (e.g., bearings, shaft, etc.) resulting in wear of the bearings due to the bearings contacting (e.g., rubbing) the labyrinth seals during bearing rotation. In some examples, the clearance between the labyrinth seal inner diameter and the shaft outer diameter may be larger than the clearance between the bearing race inner diameter and the shaft outer diameter, thus the bearings may degrade before the labyrinth seal. When the bearings or both the labyrinth seal and bearings are degraded, high pressure air may flow from the space 220, through the labyrinth seal 216, and past the bearing 208 to the oil cavity structure. Likewise, high pressure air may flow from space 222, through labyrinth seal 218, and past the bearing 209 to the oil cavity structure. The presence of air in the oil cavity may lead to an increase in engine crankcase pressure, as the oil that leaves the turbocharger 200 drains to an engine crankcase (not shown).

In one embodiment, a system comprises means for supplying a determined pressure or flow of air to an oil cavity, means for measuring a resulting pressure across, or flow through, a non-contact seal that is locatable between an oil cavity and a turbine or a compressor, and means for determining degradation of a turbocharger based on the resulting measurement of pressure or flow. Further, the system comprises means for measuring a resulting pressure across, or flow through, a bearing that is locatable between an oil cavity and a non-contact seal, and means for determining degradation of a turbocharger based on the resulting measurement of pressure or flow. As an example, means for supplying the determined pressure or flow to the oil cavity include a regulatable air input coupled to an air supply. Means for measuring the resulting pressure across or flow through the non-contact seal may include a flow measurement device, such a flow restrictor with one or more pressure sensors or gauges. Means for determining degradation of the turbocharger may include a controller and/or a look-up table.

In one embodiment, a kit is provided that interfaces with a turbine, a compressor, bearing, and a non-contact seal. The non-contact seal is positioned between an oil cavity and at least one of the turbine and the compressor. The bearing is positioned between the non-contact seal and the oil cavity. The kit includes an air source that provides a regulatable air input and can fluidically couple to an outlet or an inlet of the oil cavity. The regulatable air input couples to an air supply. A flow restrictor couples to the regulatable air input. The restrictor may optionally include one or more sensors, such as a pressure gauge. The kit can include media embodying human-readable instructions that specify correlating an amount of flow to a degree of leakage past the non-contact seal. The kit can also include media embodying human-readable instructions that specify correlating an amount of flow to a degree of leakage past the bearing.

Figure 3:
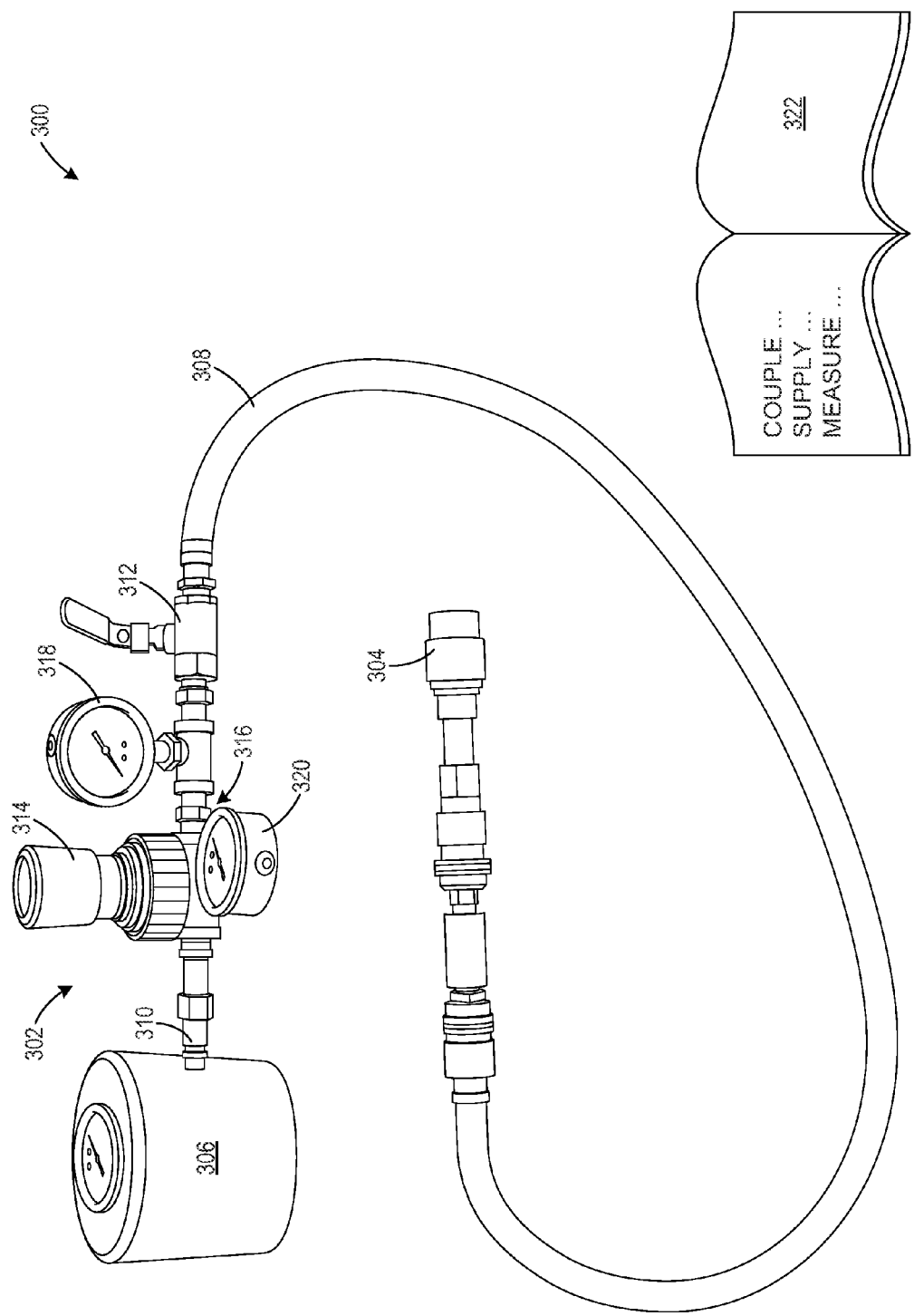
FIG. 3 shows a kit for a testing apparatus for a turbocharger according to an embodiment of the invention.

FIG. 3 shows a kit 300 for a testing apparatus 302 that may be used to test a turbocharger, such as turbocharger 200 described above with reference to FIG. 2. As will be described in greater detail below, in some examples, the testing apparatus 302 may be used to test the turbocharger while the turbocharger is still coupled to the engine (e.g., fluid communication between the engine and the turbocharger is maintained). In other examples, the testing apparatus may be used to test the turbocharger when the turbocharger is remote from the engine (e.g., the turbocharger has been removed from the engine and fluidic communication between the engine and the turbocharger is no longer maintained).

The testing apparatus 302 includes a regulatable air input 304, such as a nozzle or spout, which may be coupled to the outlet of the oil outlet or an inlet of an oil inlet of the turbocharger. The outlet and the nozzle are each configured to interact and couple with each other, and the inlet and the nozzle are each configured to interact and couple with each other. In one example, the regulatable air input may be coupled directly to the oil outlet. In such an example, the turbocharger may be remote from the engine such that the oil outlet is directly accessible. In another example, the regulatable air input 304 may be coupled to the oil outlet downstream of the oil outlet. For example, the regulatable air input 304 may be coupled to a drain passage which carries oil away from the outlet of the turbocharger and to the crankcase of the engine. In another example, the regulatable air input 304 may be coupled directly to the oil inlet while the turbocharger is still operably connected to an engine block.

Figure 4:
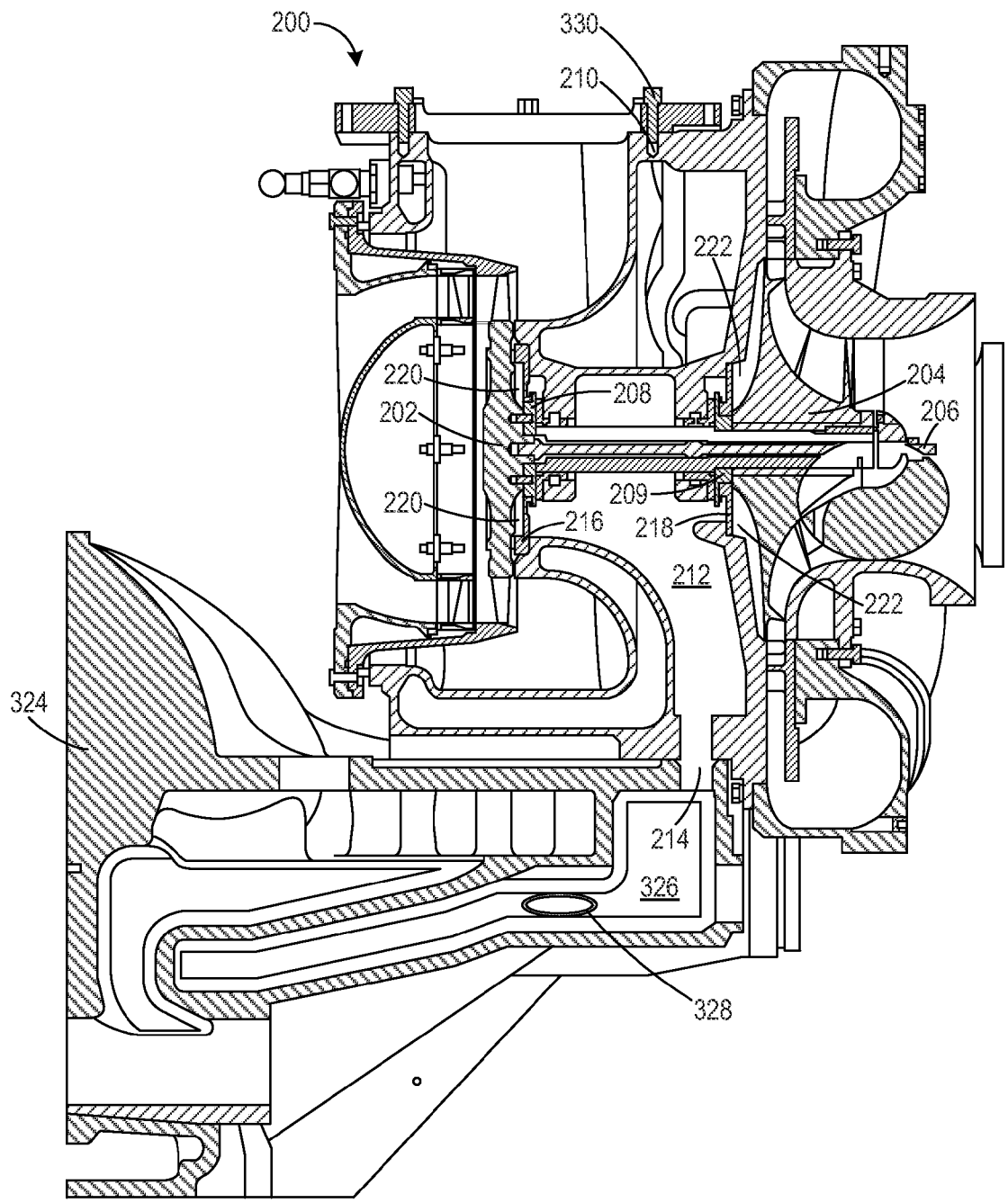
FIG. 4 shows a cross-sectional view of a turbocharger according to an embodiment of the invention.

FIG. 4 depicts an example in which the testing apparatus 302 may be used to test the turbocharger 200 while the turbocharger is coupled to an end of an engine block 324 of an engine. The embodiment illustrated in FIG. 4 includes at least some of the same components as the embodiment illustrated in FIG. 2. Components that function similarly are identified by like reference numerals.

As depicted in FIG. 4, oil drains from the oil cavity 212 into an oil drain passage 326 which is fluidically coupled to the crankcase of the engine such that the oil may be cooled and recirculated. A pressurized bladder 328, such as a pig or other suitable flow inhibitor, may be inserted into the drain passage 326 and inflated such that fluid flow to the engine crankcase is cut-off. In one example, the pressurized bladder may be inflated with the same air supply that is delivered to the oil cavity. In another example, the pressurized bladder may be self-inflatable. In other embodiments, an expansion plug may be used to block fluid flow to the crankcase. Further, a plug 330 operable to block a flow of fluid may be inserted into the oil inlet 210 of the oil cavity 212 to stop the flow of oil to the turbocharger 200. In this manner, the oil cavity 212 of the turbocharger 200 may be fluidically isolated from the engine crankcase. As such, an airflow may be supplied to the oil outlet 214 via a regulatable air input to pressurize the oil cavity 212 while the turbocharger remains coupled to the engine.

Continuing with FIG. 3, the regulatable air input 304 may be coupled to an air supply 306 via a tube 308, such as a rubber hose, metal pipe, or the like. A distal end of the tube 308 may include a connector 310 for connecting to the air supply 306. The air supply may be a tank of compressed of compressed air or compressor, such as an auxiliary compressor that supplies compresses air to various components of the engine, such as an electrically driven compressor that is driven by generator a generator coupled to the engine, for example.

The testing apparatus further includes a valve 312 coupled between the air supply 306 and the regulatable air input 304. The valve 312 may be a quarter turn valve such as a ball valve, butterfly valve, or the like, which may be opened and closed by a user of the testing apparatus 302. As depicted in FIG. 3, a regulator 314 is positioned between the valve 312 and the regulatable air input 304 in order to regulate the flow of air entering the oil cavity. Further, a flow measurement device including a flow restrictor 316 with two pressures gauges 318 and 320 is coupled between the valve 312 and the regulatable air input 304 to measure the rate of fluid flow through the regulatable air input 304. In other embodiments, the flow restrictor may be coupled to one or more sensors. Suitable sensors may include one or more pressure gauges alone or in combination with a temperature gauge, a compositional sensor, a magnetic monitor, and the like. In one embodiment, the flow measurement device flow restrictor with one or more pressure gauges may be an orifice plate.

The kit 300 includes an instructional booklet 322. Alternative media may include written, human-readable instructions that correlate an amount of flow relative to a degree of leakage past a non-contact seal. Further, the instructional booklet 322 may include written, human readable instructions that correlate to an amount of flow relative to a degree of leakage past a bearing. The instructional booklet 322 may specify coupling the regulatable air input 304 to the outlet of the oil cavity of the turbocharger. In one example, the instructions may specify coupling the regulatable air input 304 directly to the oil outlet when the turbocharger is removed from the engine. In another example in which the turbocharger remains coupled to the engine, the instructions may specify coupling the regulatable air input 304 upstream of the outlet of the oil cavity. Further, in such an example, the instructions may specify inserting a pressurized bladder into the drain passage of the oil cavity and inflating the pressurized bladder, and plugging the oil inlet with a plug to restrict oil flow to the oil cavity. The instructional booklet 322 may also specify coupling the regulatable air input 304 to the inlet of the oil cavity of the turbocharger. In one example, the instructions may specify coupling the regulatable air input 304 directly to the oil inlet when the turbocharger is connected to an engine block.

In this and other embodiments, the instructional booklet 322 may include instructions that specify supplying air from the air supply 306 to the oil cavity via the regulatable air input 304. In one example, the instructions may further specify opening the valve 312 coupled to the regulatable air input 304 downstream of the flow restrictor 316 to supply air to the oil cavity. The instructions may further specify measuring the amount of flow with the flow restrictor 316 with the two pressure gauges 318 and 320. In this manner, the amount of flow may be correlated to a degree of leakage past the non-contact labyrinth seal or a bearing such that degradation of the turbocharger may be indicated.

The instructional booklet 322 may be a media that has human-readable instructions. In other embodiments, the human-readable instructions may be provided on a computer text file, an audio or video file, or any other suitable media. For example, the human-readable instructions of the instructional booklet 322 may be stored as PDF files on a computer. A computer is a contemplated form of media that may be used to embody machine-readable instructions. In other embodiments, the machine-readable instructions may be provided via flash memory or a network server.

In an embodiment, a method for a testing apparatus for a turbocharger, the turbocharger including a turbine and a compressor, and a non-contact seal between an oil cavity and one of the turbine and the compressor, comprises inserting a plug into an inlet of the oil cavity, and supplying an airflow to an outlet of the oil cavity with a regulatable air input of the testing apparatus, the regulatable air input coupled to an air supply. The method further comprises, measuring a flow through the non-contact seal with a flow restrictor with at least one pressure gauge, the flow restrictor coupled to the regulatable air input, and indicating degradation of the turbocharger when the flow across the non-contact seal is greater than a threshold.

Figure 5:
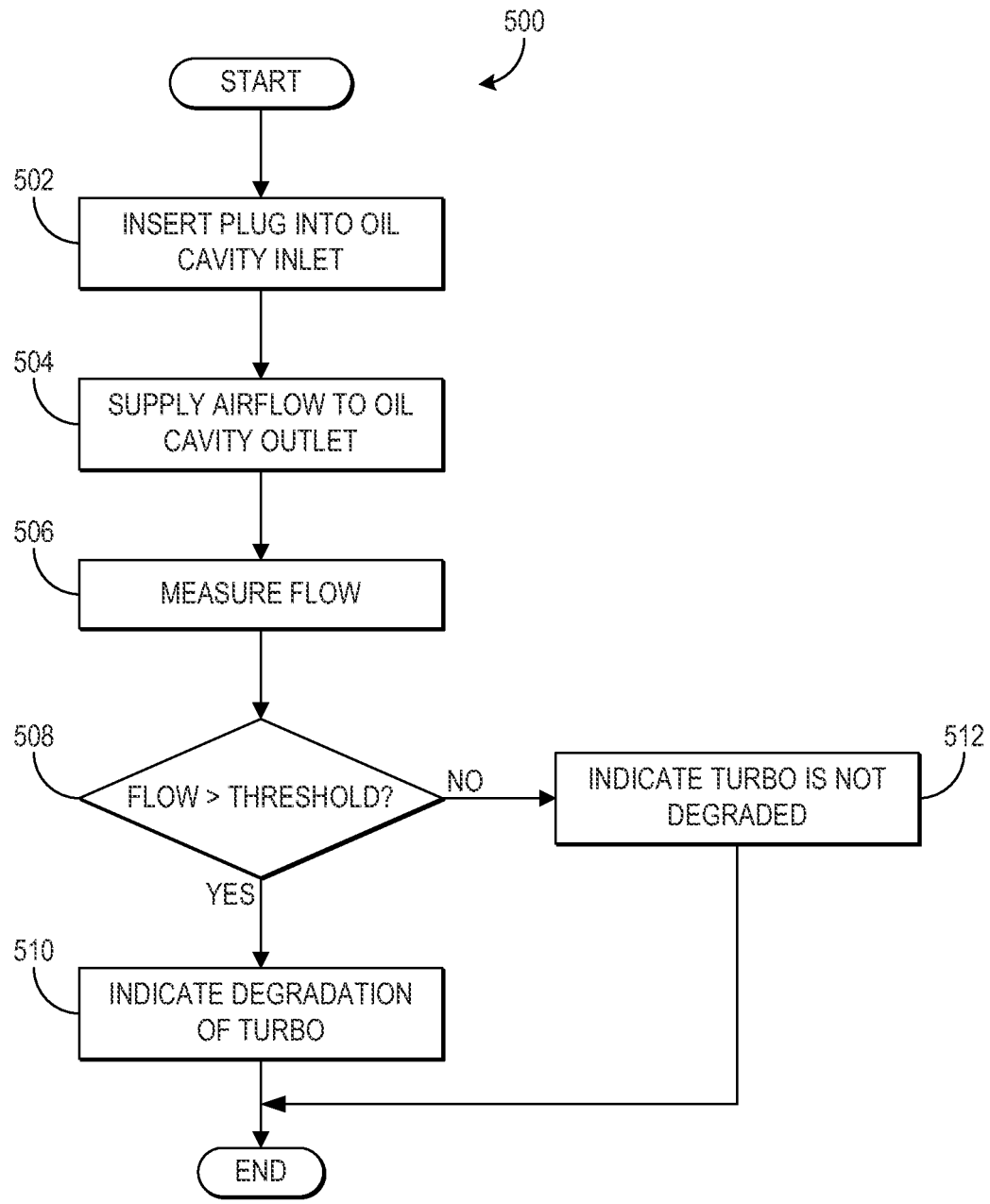
FIG. 5 shows a flow chart illustrating a method for testing a turbocharger according to an embodiment of the invention.

Continuing to FIG. 5, a method 500 for testing a turbocharger with a testing apparatus, such as the testing apparatus 302 described above, is shown. The method includes supplying a regulated airflow to an oil cavity of a turbocharger to determine a degree of leakage past a non-contact seal, such as the compressor labyrinth seal or the turbine labyrinth seal.

At 502, a plug is inserted into the oil cavity inlet. In this way, a flow of oil to the oil cavity is reversibly reduced or cut-off. Further, fluid flow out of the oil cavity, such as airflow may be restricted. At 504, airflow is supplied to the oil cavity outlet. In one example, the airflow may be supplied directly to the oil cavity outlet via the regulatable air input. In other examples, the airflow may be supplied to a location downstream of the oil outlet via a regulatable air input. For example, the airflow may be supplied to the location downstream of the oil outlet when the turbocharger is coupled to an engine. The airflow may be regulated via a regulator, for example. In this way, a predetermined pressure or flow may be supplied to the oil cavity such that the oil cavity is pressurized at a predetermined pressure.

At 506 of method 500, a flow through a flow restrictor is measured. For example, because the labyrinth seals are non-contact seals, some of the air supplied to the oil cavity will flow out of the oil cavity past the labyrinth seals. Specifically, air supplied to the oil cavity will flow from oil cavity 212, through labyrinth seals 216 and 218, to spaces 220 and 222 respectively. When the bearings and/or one or both of the labyrinth seals are worn due to contact between the bearings and labyrinth seals, a greater amount of flow will flow out of the oil cavity resulting in a greater amount of flow, or pressure change, measured by the flow restrictor. At 508, the flow that is measured is evaluated to determine if it is greater than a threshold value.

If it is determined that the flow is less than the threshold value, at 512 it is indicated that the labyrinth seals of the turbocharger are not degraded. But if it is determined that the flow is greater than the threshold value, at 510 it is determined that the degradation of the turbocharger is evident. The degradation may be due to degradation of one or both of the non-contact seals.

Figure 6:
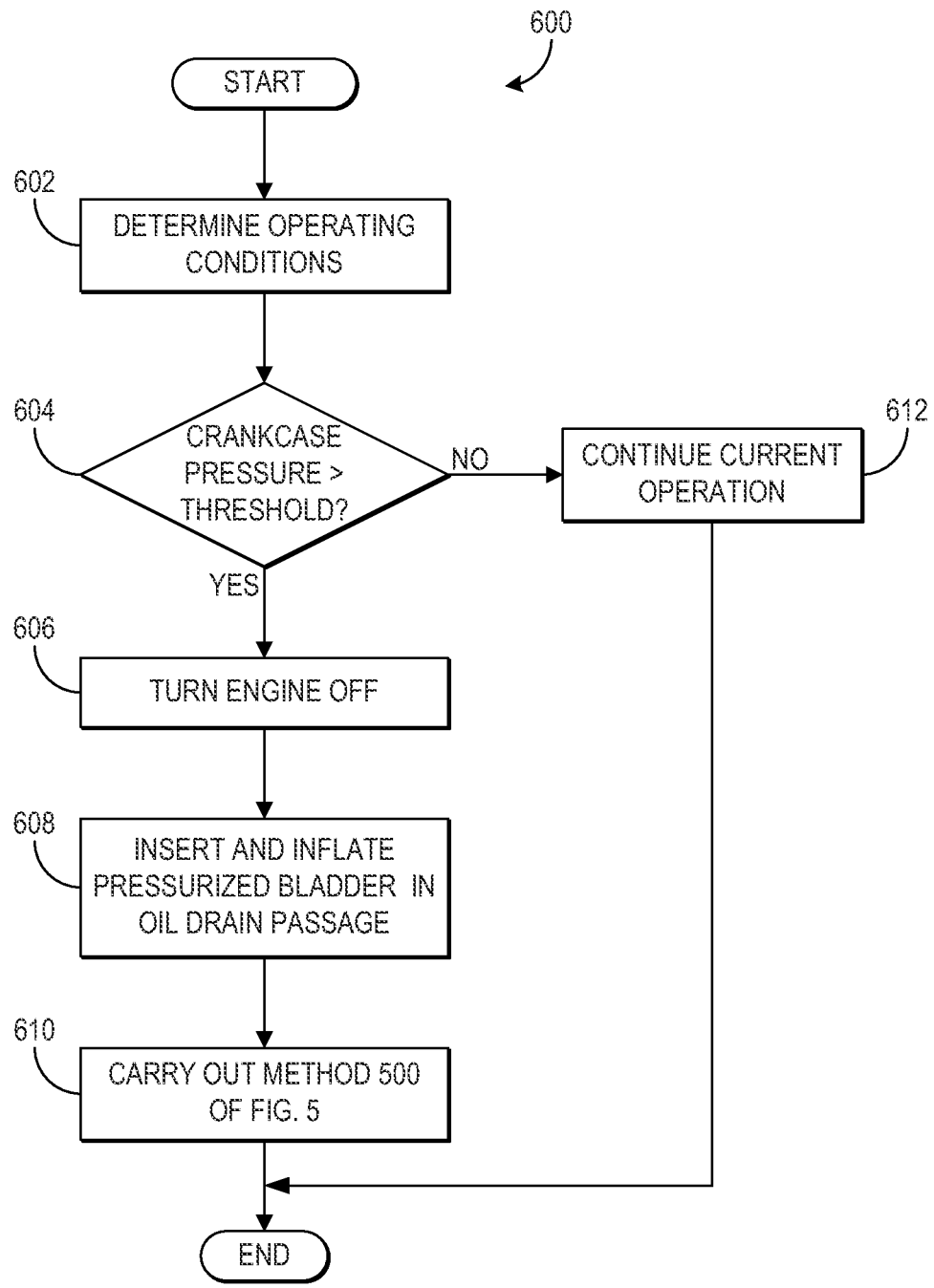
FIG. 6 shows a flow chart illustrating a method for testing a turbocharger according to an embodiment of the invention.

FIG. 6 shows a flow chart illustrating a method 600 for testing a turbocharger with a testing apparatus. The method 600 may be carried out when the turbocharger is coupled to an engine in a vehicle. At 602, the engine operating conditions are determined. The operating conditions may include boost pressure, engine crankcase pressure, engine oil temperature, ambient pressure, ambient temperature, and the like.

At 604, the crankcase pressure is sensed and is compared to a threshold pressure. During engine operation, the engine crankcase pressure may be negative with respect to the ambient (e.g., atmospheric) pressure. The threshold may be a positive pressure or an increase in pressure indicating the pressure is increasing, for example. In some examples, the threshold pressure may be a crankcase over-pressure. The crankcase pressure may be measured by a pressure sensor in communication with the engine controller, for example, such that an operator of the vehicle in which the engine is positioned is notified (e.g., by a malfunction indicator lamp (MIL), or the like) that the crankcase pressure is increasing. If it is determined that the crankcase pressure is less than the threshold pressure, method 600 moves to 612 and current engine operation is continued.

If it is determined that the engine crankcase pressure exceeds the threshold pressure, at 606 the engine is turned off or de-rated. The engine may be shut down or stopped such that the engine is no longer spinning. Once the engine is shut down, at 608 a pressurized bladder is inserted into the oil drain passage and inflated to create a sealing engagement with the passage inner surface. The pressurized bladder may cut off fluid communication between the engine crankcase and the oil cavity. At 610, the method 500 described above with reference to FIG. 5 is carried out. A degradation of the turbocharger may be diagnosed while the turbocharger remains coupled to the engine in the vehicle.

Thus, degradation of a turbocharger leading to increased engine crankcase pressure may be diagnosed while the turbocharger remains coupled to the engine or if the turbocharger is disassembled from the engine. By reversibly plugging the oil inlet and the drain passage, the oil cavity may be fluidically isolated from crankcase and the oil system during testing of the turbocharger such that air may only leak out of the oil cavity through orifices around the labyrinth seals, which are inherent in non-contact seals. In this manner, degradation of the non-contact seals may be determined, as flow through the orifices increases as the size of the orifices increases due to degradation. Further, crankcase over-pressure events in which the turbocharger is removed from the engine system even though the turbocharger is not degraded may be reduced.

Figure 7:
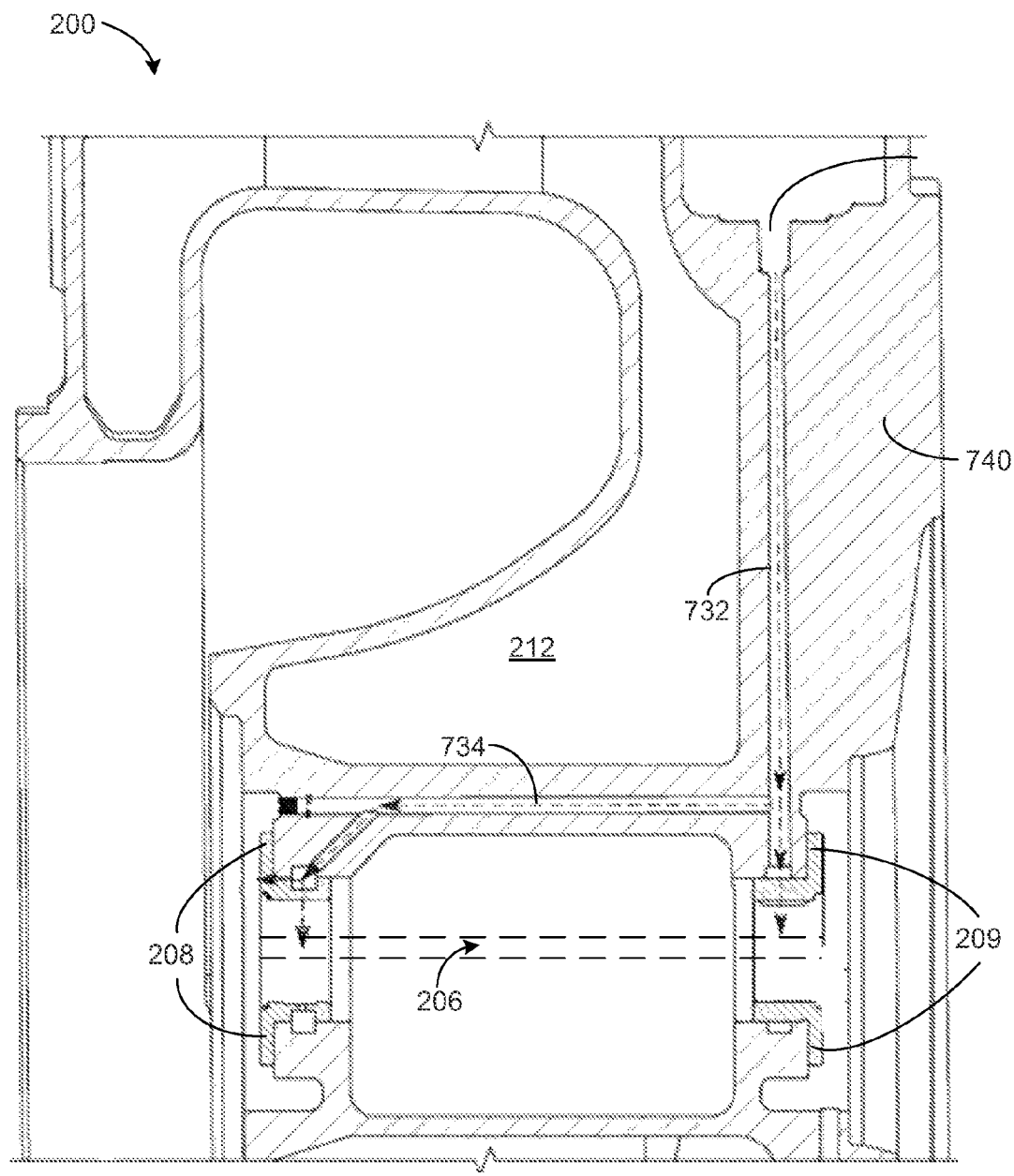
FIG. 7 shows a cross-sectional view of a turbocharger according to an embodiment of the invention.

FIG. 7 shows a different cross section of the turbocharger described with reference to FIG. 2. The embodiment illustrated in FIG. 7 includes at least some of the same components as the embodiment illustrated in FIG. 2. Components that function similarly are identified by like reference numerals.

As depicted in FIG. 7, the turbocharger 200 further includes two bearings, a turbine bearing 208 and compressor bearing 209, which support a shaft 206 such that the shaft may rotate at a high speed with reduced friction. In one embodiment, turbine bearing 208 is positioned between the oil cavity 212 and the turbine 202 and a compressor bearing 209 is positioned between the oil cavity 212 and the compressor 204.

A bearing as used herein refers to a type of machine element constraining the motion of a shaft, and reducing friction as the shaft rotates at high speeds. In one embodiment, the bearing may be a plain bearing such as a journal bearing having a bearing race. In other embodiments, the bearing may be another type of bearing, such as a fluid bearing, a rolling-element bearing, or any other suitable type of bearing. Herein, the bearing is applied to a rotating shaft system, with an inner diameter of the race separated from the outer diameter of the rotating turbocharger shaft by a small clearance, and an outer diameter of the race stationary and coupled with the bearing housing. In this way, the bearings 208 and 209 support the shaft 206 during rotation, the shaft being connected to the blades of the turbine 202 and compressor 204. To reduce degradation of the bearings and to maintain a temperature of the bearings (e.g., to keep the bearings cool), the bearings may be lubricated by a fluid such as oil. As depicted in FIG. 7, the turbocharger 200 further includes an oil inlet 210 through which pressurized oil may enter. In one embodiment, the oil inlet 210 supplies oil to lubricate bearing 209 via oil inlet drilling 732, and to lubricate bearing 208 via an oil cross drilling 734. Oil inlet drilling 732, oil cross drilling 734, bearing 208, and bearing 209 are each fluidically coupled to one another. In one example, oil inlet drilling 732 and oil cross drilling 734 may be completely contained within the turbine casing 740 such that the oil inlet drilling 732 and oil cross drilling 734 are fluidically isolated from the oil supply system by the bearings 208 and 209. Therefore, oil entering the oil inlet 210 may only enter the oil cavity 212 by passing through the bearings 208 and 209. As noted herein, the oil drilling and oil cavity are fluidically isolated from the compressed intake air flowing through the compressor and the expanding exhaust gas flowing through the turbine. As such, in some embodiments, neither the intake air flow nor the exhaust gas flow are utilized during the bearing and/or seal testing described herein.

FIG. 7 depicts an example in which the testing apparatus 302 may be used to test the turbocharger 200 while the turbocharger is coupled to an end of an engine block 324 of an engine. As depicted in FIG. 7, oil enters an oil inlet drilling 732 from oil inlet 210. An oil supply line (not pictured) may be removed from the oil inlet 210, and an air input may be coupled to the oil inlet 210, such that oil flow into oil inlet drilling 732 is cut-off. An air flow may be supplied to the oil inlet 210 via the regulatable air input to pressurize the oil inlet drilling 732 and the oil cross drilling 734. As the oil inlet drilling 732 and the oil cross drilling 734 are fluidically isolated from the oil cavity 212 by the bearings 208 and 209, a plug need not be inserted into oil outlet 214. Such testing occurs while the turbocharger is not operating, and when the engine is not operating. For example, the testing may occur while the engine is at rest and the turbocharger is at rest (not spinning)

Figure 8:
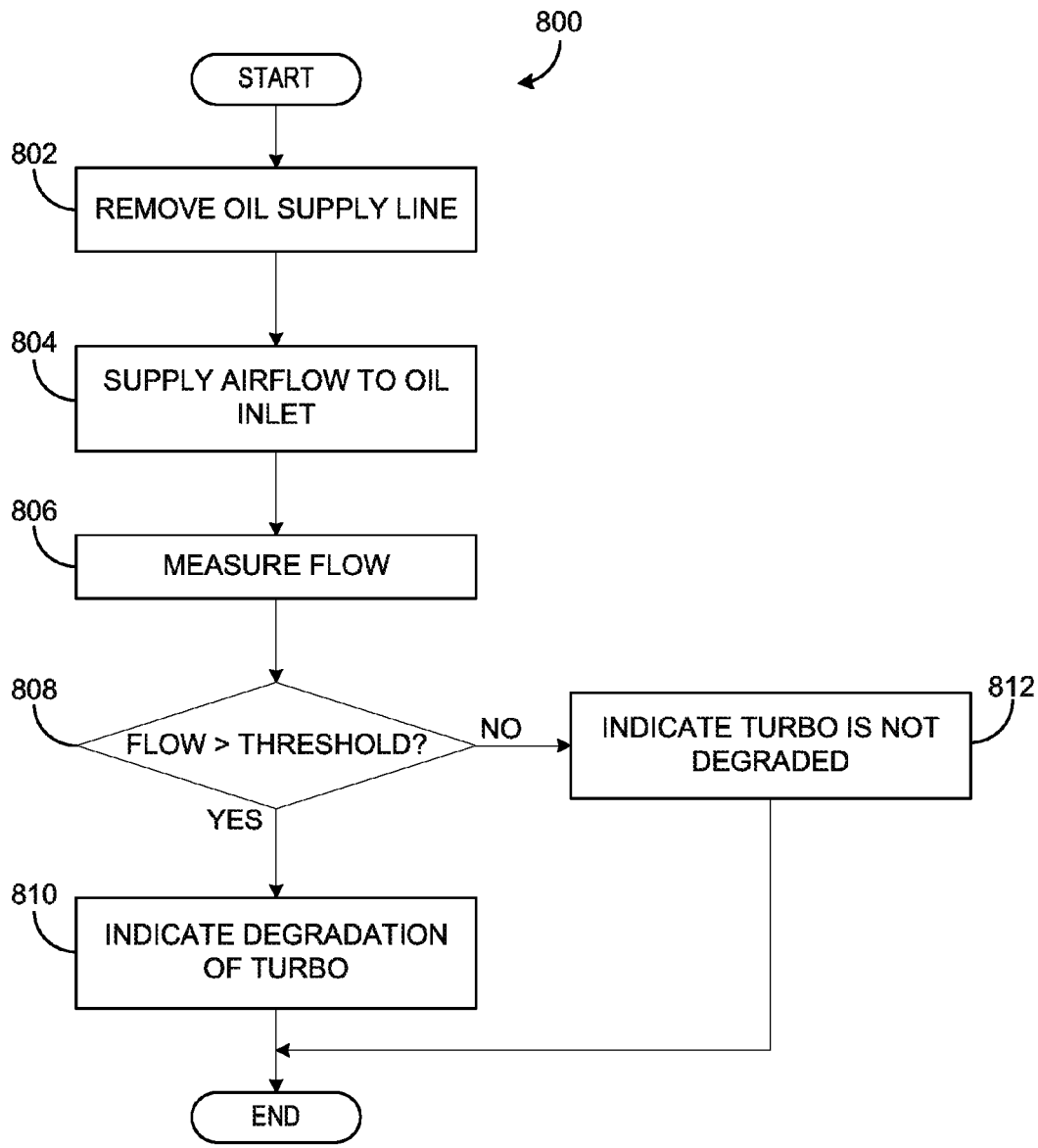
FIG. 8 shows a flow chart illustrating a method for testing a turbocharger according to an embodiment of the invention.

Continuing to FIG. 8, a method 800 for testing a turbocharger with a testing apparatus, such as the testing apparatus 302 described above, is shown. The method includes supplying a regulated airflow to an oil inlet of a turbocharger to determine a degree of leakage past a bearing or bearing component, such as the compressor bearing or the turbine bearing, while the turbocharger is fully coupled to the engine in its operational position, with the engine and turbocharger at rest.

At 802, a supply line is removed from the oil inlet. In this way, a flow of oil to the oil cavity is reversibly reduced or cut-off. At 804, airflow is supplied to the oil inlet. In one example, the airflow may be supplied directly to the oil inlet via the regulatable air input. The airflow may be regulated via a regulator, for example. In this way, a predetermined pressure or flow may be supplied to an oil inlet drilling and oil cross drilling such that the drillings are pressurized at a predetermined pressure.

At 806 of method 800, a flow through a flow restrictor is measured. For example, because a small clearance separates an inner diameter of a bearing race from an outer diameter of a shaft, some of the air supplied to the oil inlet drilling and oil cross drilling will flow out of the drillings past the bearings. Specifically, air supplied to the oil inlet drilling 732 and oil cross drilling 734 will flow from the drillings, through bearings 208 and 209, to the oil cavity 212. When one or both of the bearings are worn due to contact between the bearings and labyrinth seals, a greater amount of air flow supplied by the regulatable air input will flow out of the oil drillings and a greater amount of air flow, or pressure change, will be measured by the flow restrictor. At 808, the air flow that is measured is evaluated to determine if it is greater than a threshold value. In one example, the threshold air flow may be the amount of air flow that would flow out of the oil drillings when the bearings and labyrinth seals and other bearing components are functional (e.g., not degraded), at a given flow or pressure of supplied air input.

If it is determined that the air flow is less than the threshold value, at 812 it is indicated that the bearings of the turbocharger are not degraded. But if it is determined that the air flow is greater than the threshold value, at 810 it is determined that the degradation of the turbocharger is evident. The degradation may be due to degradation of one or both of the bearings.

Figure 9:
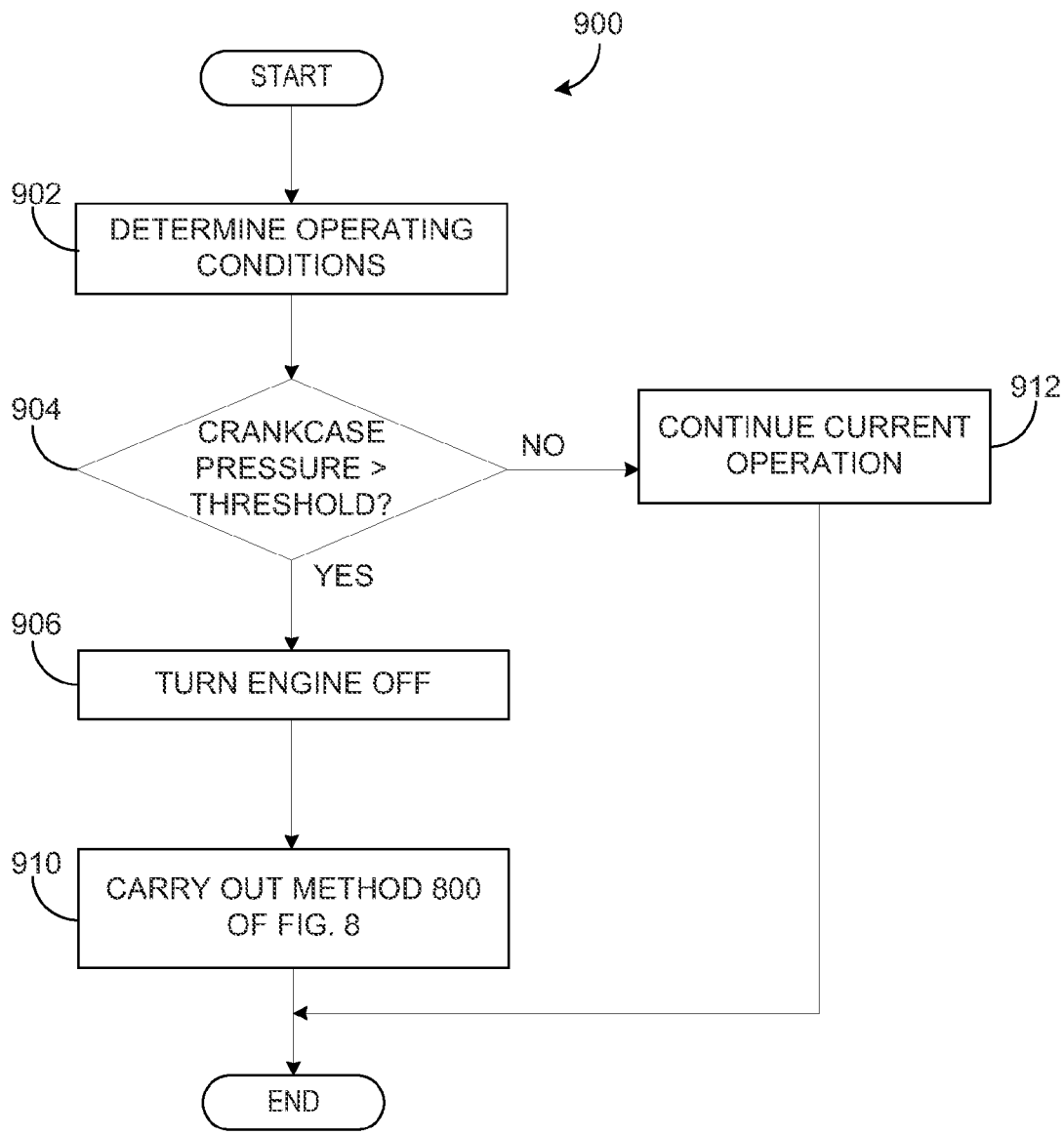
FIG. 9 shows a flow chart illustrating a method for testing a turbocharger according to an embodiment of the invention.

FIG. 9 shows a flow chart illustrating a method 900 for testing a turbocharger with a testing apparatus. The method 900 may be carried out when the turbocharger is coupled to an engine in a vehicle. At 902, the engine operating conditions are determined. The operating conditions may include boost pressure, engine crankcase pressure, engine oil temperature, ambient pressure, ambient temperature, and the like.

At 904, the crankcase pressure is sensed and is compared to a threshold pressure. During engine operation, the engine crankcase pressure may be negative with respect to the ambient (e.g., atmospheric) pressure. The threshold may be a positive pressure or an increase in pressure indicating the pressure is increasing, for example. In some examples, the threshold pressure may be a crankcase over-pressure. The crankcase pressure may be measured by a pressure sensor in communication with the engine controller, for example, such that an operator of the vehicle in which the engine is positioned is notified (e.g., by a malfunction indicator lamp (MIL), or the like) that the crankcase pressure is increasing. If it is determined that the crankcase pressure is less than the threshold pressure, method 900 moves to 912 and current engine operation is continued.

If it is determined that the engine crankcase pressure exceeds the threshold pressure, at 906 the engine is turned off or de-rated. The engine may be shut down or stopped such that the engine is no longer spinning. Once the engine is shut down, at 910, the method 800 described above with reference to FIG. 8 is carried out. A degradation of the turbocharger may be diagnosed while the turbocharger remains coupled to the engine in the vehicle.

Thus, degradation of a turbocharger leading to increased engine crankcase pressure may be diagnosed while the turbocharger remains coupled to the engine block. By removing the oil supply line, air may be supplied to the oil inlet and the oil inlet drilling and oil cross drilling. The oil inlet drilling and oil cross drilling may be housed within the turbocharger casing and fluidically coupled, and fluidically isolated from the oil system by the bearings. Therefore, air supplied to the oil inlet may pressurize the oil inlet drilling and oil cross drilling. As such, during testing of the turbocharger, air may only leak out of the oil inlet drilling and oil cross drilling through the clearance between the inner diameter of the bearing race and outer diameter of the shaft. In this manner, degradation of the bearings may be determined, as flow through the clearance increases as the size of the clearance increases due to bearing degradation. Further, crankcase over-pressure events in which the turbocharger is removed from the engine system even though the turbocharger is not degraded may be reduced.

In an embodiment, a testing apparatus comprises a regulatable air input source configured to fluidically couple to one of an oil inlet or an oil outlet of an oil structure cavity of a turbocharger; an air flow measurement device including a flow restrictor which is configured to be coupled to the regulatable air input source; and media embodying instructions for correlating an amount of measured air flow measured by the air flow measurement device to a degree, rate, or amount of leakage past a turbocharger bearing component configured to restrict flow to or from the oil structure cavity. In an example, the media may include human-readable media.

The media may specify coupling the regulatable air input source directly to the oil outlet of the oil structure cavity. The media may specify coupling the regulatable air input source to a location that is upstream of the oil outlet of the oil structure cavity.

The testing apparatus may further comprise a pressurizable bladder configured to couple to a drain passage of the oil structure cavity, and the media may specify inserting the pressurizable bladder in the drain passage of the oil structure cavity and inflating the pressurizable bladder.

The testing apparatus may further comprise a plug configured to couple to the oil inlet of the oil structure cavity, and the media may specify inserting the plug into the oil inlet of the oil structure cavity.

The media may specify opening a valve coupled to the regulatable air input source downstream of the flow restrictor to supply air to the oil structure cavity. The flow restrictor may include at least one pressure gauge and the media may specify measuring the amount of measured air flow with the at least one pressure gauge of the flow restrictor.

The testing apparatus may further comprise a valve configured to be coupled between an air supply and the regulatable air input source, and a regulator configured to be coupled at a location between the valve and the regulatable air input source.

The bearing component may be a non-contact labyrinth seal positioned in the turbocharger, and the turbocharger may include a turbine labyrinth seal configured to be coupled between a turbine of the turbocharger and the oil structure cavity and a compressor labyrinth seal configured to be coupled between a compressor of the turbocharger and the oil structure cavity.

The media may specify a threshold air flow at which degradation of a turbocharger is determined.

In another embodiment, a testing apparatus comprises a regulatable air input source configured to fluidically couple to an inlet of an oil structure cavity; an air flow measurement device including a flow restrictor which is configured to be coupled to the regulatable air input source; and media embodying instructions for correlating an amount of measured air flow measured by the air flow measurement device to a degree, rate, or amount of leakage past a bearing component.

The oil structure cavity may be within a turbocharger housing and fluidically isolated from a compressor intake air path or passage. The bearing component may be a bearing and bearing seal coupled to a shaft connecting a turbocharger compressor and turbocharger turbine. The bearing component may be a journal bearing of a shaft connecting a turbocharger compressor and turbocharger turbine. The bearing component may be a journal bearing.

The instructions may specify correlating the amount of measured air flow, separate and different from airflow through an intake air passage of a compressor of a turbocharger in which the bearing is positioned, to the degree, rate, or amount of leakage past the journal bearing.

In a further embodiment, a testing apparatus comprises a regulatable air input source configured to fluidically couple to an oil structure cavity; an air flow measurement device including a flow restrictor which is configured to be coupled to the regulatable air input source; and media embodying instructions for correlating an amount of measured air flow measured by the air flow measurement device to at least one of a degree, rate, or amount of leakage past a bearing or non-contact bearing seal configured to restrict flow to or from the oil structure cavity.

The media may specify coupling the regulatable air input source directly to the outlet of the oil structure cavity. The media may specify coupling the regulatable air input source directly to the inlet of the oil structure cavity.

The amount of measured air flow correlated to bearing degradation may be separate and distinct from any airflow through an intake air passage of a compressor of a turbocharger in which the bearing or non-contact bearing seal is positioned.

In another embodiment of the testing apparatus, the testing apparatus further comprises a processor (e.g., as part of a computer unit or other electronic device) configured to receive data of the amount of the measured air flow measured by the air flow measurement device. For example, the air flow measurement device may be configured to output the data, or there may be a sensor operably coupled to the air flow measurement device, with the sensor being electrically connected to a data-input port of the processor and configured to output the data. The media comprises non-transitory, tangible media having the instructions which, when executed by the processor, cause the processor: to correlate (e.g., automatically/autonomously correlate) the amount of the measured air flow measured by the air flow measurement device to the at least one of the degree, rate, or amount of leakage; and to output a signal relating to the at least one of the degree, rate, or amount of leakage. For example, the signal may be configured to control a display for displaying the degree, rate, and/or amount of leakage to an operator. (The non-transitory computer-readable media comprises all processor-readable media, with the sole exception being a transitory, propagating signal.)

Any of the other embodiments of the testing apparatus as set forth herein may similarly include a processor that is configured similarly to the processor described in the section immediately above, and with media (comprising non-transitory, tangible media) similarly configured with instructions for execution by the processor.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:
1. A testing apparatus, comprising:
a regulatable air input configured to fluidically couple to an oil inlet of an oil structure cavity of a turbocharger, the oil inlet upstream of a turbocharger bearing component configured to restrict flow to the oil structure cavity;
an air flow measurement device including a flow restrictor which is configured to be coupled to the regulatable air input; and
media embodying instructions for:
coupling the regulatable air input directly to the oil inlet; and
correlating an amount of measured air flow measured by the air flow measurement device to at least one of a degree, rate, or amount of leakage past the turbocharger bearing component.

2. The testing apparatus of claim 1, wherein the media specifies opening a valve coupled to the regulatable air input downstream of the flow restrictor to supply air to the oil structure cavity.

3. The testing apparatus of claim 1, wherein the flow restrictor includes at least one pressure gauge and the media specifies measuring the amount of measured air flow with the at least one pressure gauge of the flow restrictor.

4. The testing apparatus of claim 1, further comprising a valve configured to be coupled between an air supply and the regulatable air input, and a regulator configured to be coupled at a location between the valve and the regulatable air input.

5. The testing apparatus of claim 1, wherein the media specifies a threshold air flow at which degradation of the turbocharger is determined.

6. The testing apparatus of claim 1, wherein the media specifies removing an oil supply line prior to coupling the regulatable air input to the oil inlet.

7. A testing apparatus, comprising:
a regulatable air input configured to fluidically couple to one of an oil inlet or an oil outlet of an oil structure cavity of a turbocharger;
an air flow measurement device including a flow restrictor which is configured to be coupled to the regulatable air input;
media embodying instructions for correlating an amount of measured air flow measured by the air flow measurement device to at least one of a degree, rate, or amount of leakage past a turbocharger bearing component configured to restrict flow to or from the oil structure cavity; and
a pressurizable bladder configured to couple to a drain passage of the oil structure cavity, wherein the media specifies inserting the pressurizable bladder in the drain passage of the oil structure cavity and inflating the pressurizable bladder.

8. The testing apparatus of claim 7, wherein the media specifies coupling the regulatable air input directly to the oil outlet of the oil structure cavity.

9. The testing apparatus of claim 7, wherein the media specifies coupling the regulatable air input to a location that is downstream of the oil outlet of the oil structure cavity.

10. The testing apparatus of claim 7, further comprising a plug configured to couple to the oil inlet of the oil structure cavity, wherein the media specifies inserting the plug into the oil inlet of the oil structure cavity.

11. The testing apparatus of claim 7, wherein the media specifies opening a valve coupled to the regulatable air input downstream of the flow restrictor to supply air to the oil structure cavity.

12. The testing apparatus of claim 7, wherein the flow restrictor includes at least one pressure gauge and the media specifies measuring the amount of measured air flow with the at least one pressure gauge of the flow restrictor.

13. The testing apparatus of claim 7, further comprising a valve configured to be coupled between an air supply and the regulatable air input, and a regulator configured to be coupled at a location between the valve and the regulatable air input.

14. The testing apparatus of claim 7, wherein the media specifies a threshold air flow at which degradation of the turbocharger is determined.

15. A testing apparatus, comprising:
a regulatable air input configured to fluidically couple to one of an oil inlet or an oil outlet of an oil structure cavity of a turbocharger, the turbocharger including bearings and a turbine non-contact labyrinth seal positioned between a turbine of the turbocharger and the oil structure cavity, the regulatable air input configured to supply pressurized air to the oil structure cavity, bearings, and turbine non-contact labyrinth seal;
an air flow measurement device including a flow restrictor which is configured to be coupled to the regulatable air input; and
media embodying instructions for correlating an amount of measured air flow measured by the air flow measurement device to at least one of a degree, rate, or amount of leakage past the bearings and/or turbine non-contact labyrinth seal.

16. The testing apparatus of claim 15, wherein the media specifies opening a valve coupled to the regulatable air input downstream of the flow restrictor to supply air to the oil structure cavity.

17. The testing apparatus of claim 15, wherein the flow restrictor includes at least one pressure gauge and the media specifies measuring the amount of measured air flow with the at least one pressure gauge of the flow restrictor.

18. The testing apparatus of claim 15, further comprising a valve configured to be coupled between an air supply and the regulatable air input, and a regulator configured to be coupled at a location between the valve and the regulatable air input.

19. The testing apparatus of claim 15, wherein the media specifies a threshold air flow at which degradation of the turbocharger is determined.

* * * * *